(12) United States Patent
Wiest et al.

(10) Patent No.: US 9,897,471 B2
(45) Date of Patent: Feb. 20, 2018

(54) COUPLING ELEMENT, ULTRASONIC TRANSDUCER AND ULTRASONIC FLOW METER

(71) Applicant: Endress + Hauser Flowtec AG, Reinach (CH)

(72) Inventors: Achim Wiest, Weil am Rhein (DE); Andreas Berger, Hasel-Glashutten (DE); Sascha Grunwald, Steinen (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 211 days.

(21) Appl. No.: 14/787,543

(22) PCT Filed: Apr. 11, 2014

(86) PCT No.: PCT/EP2014/057406
§ 371 (c)(1),
(2) Date: Oct. 28, 2015

(87) PCT Pub. No.: WO2014/177365
PCT Pub. Date: Nov. 6, 2014

(65) Prior Publication Data
US 2016/0116318 A1    Apr. 28, 2016

(30) Foreign Application Priority Data
May 3, 2013   (DE) .......................... 10 2013 104 542

(51) Int. Cl.
*G01F 1/66*   (2006.01)
*G01F 15/00*   (2006.01)

(52) U.S. Cl.
CPC ............ *G01F 1/662* (2013.01); *G01F 15/006* (2013.01)

(58) Field of Classification Search
CPC .............................. G01F 15/006; G01F 1/662
See application file for complete search history.

(56) References Cited

U.S. PATENT DOCUMENTS

| 5,457,352 A | 10/1995 | Muller et al. |
| 8,408,072 B2 | 4/2013 | Berger et al. |

(Continued)

FOREIGN PATENT DOCUMENTS

| CN | 2092757 U | 1/1992 |
| CN | 2282682 Y | 5/1998 |

(Continued)

OTHER PUBLICATIONS

Translation of DE4230773.*

(Continued)

*Primary Examiner* — Daniel Pihulic
(74) *Attorney, Agent, or Firm* — Bacon & Thomas, PLLC

(57) ABSTRACT

A coupling element for an ultrasonic transducer, which comprises a first recess provided for the arrangement of a piezoelectric element and comprising a terminal base surface in which an ultrasound signal generated by the piezoelectric element can be fed into the coupling element. The coupling element comprising inside the first recess one or a plurality of stops, each of which comprises at least one stop surface which extends along a plane, the plane extending parallel to the base surface of the first recess, and there being defined between this plane and the base surface a space for accommodating material for an acoustic adaptation layer. The invention further concerns an ultrasonic transducer and an ultrasonic flow meter.

11 Claims, 3 Drawing Sheets

(56) References Cited

U.S. PATENT DOCUMENTS

| | | |
|---|---|---|
| 8,547,000 B2 | 10/2013 | Ueberschlag et al. |
| 8,596,139 B2 | 12/2013 | Mueller |
| 8,698,378 B2 | 4/2014 | Mueller |
| 9,097,567 B2 | 8/2015 | Wiest et al. |
| 2012/0038248 A1 | 2/2012 | Mueller et al. |
| 2016/0116318 A1* | 4/2016 | Wiest .................. G01F 15/006 73/861.18 |

FOREIGN PATENT DOCUMENTS

| | | | |
|---|---|---|---|
| CN | 1818634 A | 8/2006 | |
| CN | 101504286 A | 8/2009 | |
| CN | 201527288 U | 7/2010 | |
| CN | 101900233 A | 12/2010 | |
| CN | 102265121 A | 11/2011 | |
| CN | 102265332 A | 11/2011 | |
| CN | 202256270 U | 5/2012 | |
| CN | 102708851 A | 10/2012 | |
| DE | 4230773 C | 2/1994 | |
| DE | 102007039016 A1 | 2/2009 | |
| DE | 102008055123 B3 | 7/2010 | |
| DE | 102010063538 A1 | 6/2012 | |
| DE | 102011079250 A1 | 1/2013 | |
| DE | 102013104542 A1 * | 11/2014 | ............ G01F 1/662 |
| EP | 0974814 B1 | 1/2000 | |
| WO | WO-2014177365 A1 * | 11/2014 | ............ G01F 1/662 |

OTHER PUBLICATIONS

Translation of DE102011079250.*
Translation of EP0974814.*
English Translation of International Preliminary Report on Patentability, WIPO, Geneva, Nov. 12, 2015.
International Search Report,, EPO, The Netherlands, dated Jun. 27, 2014.
German Search Report, German PTO, Munich, dated Jan. 16, 2014.
German Search Report, German PTO, Munich, dated Jul. 8, 2014.

* cited by examiner

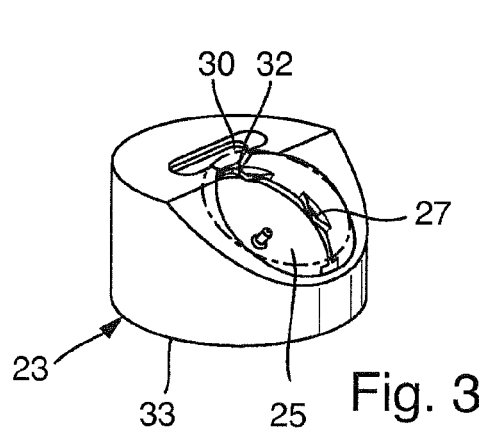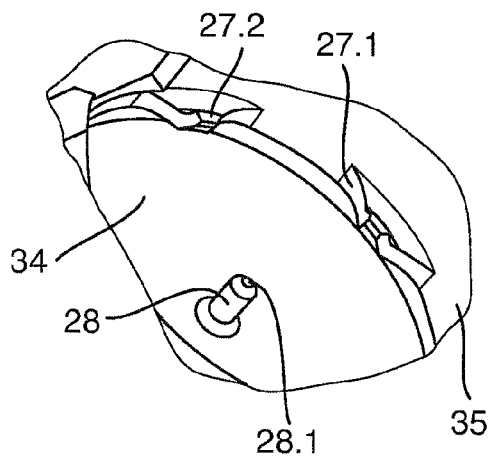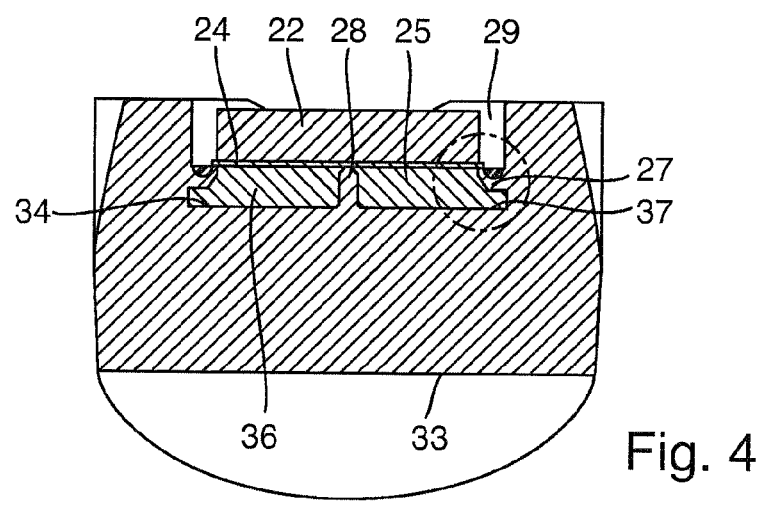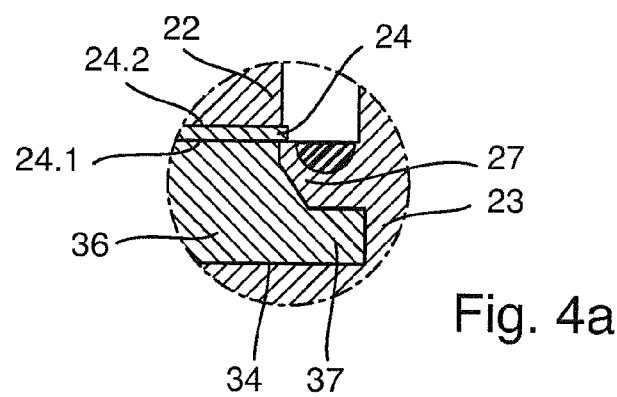

COUPLING ELEMENT, ULTRASONIC TRANSDUCER AND ULTRASONIC FLOW METER

TECHNICAL FIELD

The present invention relates to a coupling element, an ultrasonic transducer and an ultrasonic flow meter.

BACKGROUND DISCUSSION

A plurality of different assemblies and layer sequences are known in the field of ultrasonic transducer assemblies.

The generic European Patent EP 0 974 814 B1 discloses a coupling element with a support or contact surface, which has a recess for holding a piezoelectric element. A metal disk is arranged between the coupling element and the piezoelectric element. This metal disk is glued onto a plane, which is inclined to the support surface and also forms a base surface of the recess. This design has fundamentally proven itself and is appealing owing to its high thermal cycling. However, occurrence of high impedance differences between the metal disk and the coupling element has been observed.

SUMMARY OF THE INVENTION

Therefore, it is an object of the present invention to provide a coupling element and an ultrasonic transducer, which reduce the problems described above, while ensuring continued resistance to high thermal cycling.

The invention achieves this object by a coupling element for an ultrasonic transducer which comprises a first recess. This recess is, for example, an oblique borehole, which is formed as a blind hole. The recess has a terminal base surface. This base surface is preferably formed more or less flat, but may comprise corrugations, embossments and the like to increase the surface area and for better adhesion of a casting compound to be applied on the base surface. Said first recess is provided for the arrangement of a piezoelectric element.

According to the invention, a coupling element for an ultrasonic transducer comprises a first recess. This recess is, for example, an oblique borehole, which is formed as a blind hole. The recess has a terminal base surface. This base surface is preferably formed more or less flat, but may comprise corrugations, embossments and the like to increase the surface area and for better adhesion of a casting compound to be applied on the base surface. Said first recess is provided for the arrangement of a piezoelectric element.

Into the base surface, the ultrasound signal, which was previously generated by a piezoelectric element and may be transmitted to the coupling element via other intermediate layers, such as a metal disk, is introduced, in particular, orthogonally to the base surface.

The coupling element comprises one or a plurality of stops within the recess according to the invention. These stops are used to position a support disk, or used directly in a less preferred embodiment of the piezoelectric element, and are aligned preferably in a plane parallel to the base surface due to the alignment of the stop surfaces. For this purpose, a stop has a stop surface, on which, for example the support disk or the piezoelectric element rests and which extends along a plane.

The plane is arranged parallel to the base surface of the first recess and spaced from the latter. Together with the peripheral side of the recess, this plane and the base surface form a space that is intended to accommodate the material for an acoustic adaptation layer.

Due to these geometric requirements, an adaptation layer, which, in addition to the support disk, provides improved impedance matching with respect to the piezoelectric element and the support disk, may easily be inserted into the coupling body described above. The positioning of the support disk and/or the piezoelectric element on the adaptation layer made of casting compound is defined by the stops and is done parallel to the base surface of the first recess.

According to the invention, an ultrasonic transducer comprises a coupling element, in which a sequence of a piezoelectric element, a support disk and an adaptation layer is arranged. To facilitate positioning of the support disk, the coupling element is equipped with stops.

The coupling element has a first recess, wherein a piezoelectric element is arranged in the first recess. The first recess also has a terminal base surface. An ultrasound signal generated by the piezoelectric element can be introduced into this base surface, which is preferably perpendicular thereto.

In the first recess, a support disk also is provided for supporting the piezoelectric element, which is preferably a support disk. Alternatively, this disk may also be made of another suitable material with the appropriate impedance, thermal expansion and mechanically compensating effect, for example ceramic, glass or a composite material made of several materials, whose acoustic effect appears to be homogeneous and the inhomogeneities are small compared with the wavelength.

The support disk allows for support of the piezoelectric element in a plane which is parallel to the terminal base surface of the coupling element. Here, the support disk reduces thermal stresses on the piezoelectric element.

The support disk preferably has a layer thickness of less than $\frac{1}{8}$ $\lambda$ (lambda), preferably less than $\frac{1}{16}$ $\lambda$. It does not assume the function of acoustic adaptation, but merely thermal equilibration, relative to the layers arranged underneath, with respect to the coupling element and an adaptation layer. The thermal shim preferably has a thermal coefficient of expansion of less than 30 ppm/K, particularly preferably less than 25 ppm/K. The support disk should preferably have a flat design so that there is no angular misalignment between the plane of the base surface and the plane of the piezoelectric element. The flatness of the support disk is in this case preferably less than $\frac{1}{16}$, preferably less than $\frac{1}{32}$ lambda.

The piezoelectric element is arranged on the top of the support disk that is turned away from the coupling element. The arrangement can be made directly on the support disk, wherein the support disk, in a preferred embodiment, centers the piezoelectric element and also secures the piezoelectric element against slipping sideways. Alternatively, a layer of coupling grease or similar sound-transmitting, liquid coupling media, which may compensate for irregularities between the piezoelectric element and the support disk, can also be applied between the support disk and the piezoelectric element.

Together with the peripheral side of the recess, the support disk and the base surface delimit a space in which an adaptation layer is arranged for adaptation of the acoustic impedances between the support disk and the coupling element; this is in contrast to the previously known adhesive layer. Without an adaptation of the acoustic impedance, there is non-reflection-free transmission of the sound energy and reduction of the signal intensity. An impedance transformation is done by the adaptation layer, so that reflection-free sound transmission can be carried out as far as possible within a limited frequency range. This adaptation layer is preferably made of a hardened plastic material, in particular a casting compound. This may preferably have at least the thickness of at least $3/8\lambda$ (lambda), but preferably $\lambda/4$ or a multiple of $\lambda/4+n*\lambda/2$, where n is an integer multiple. The submissions relate to a layer thickness which corresponds to the wavelength of the ultrasound signal in the material of the adaptation layer.

While a thin layer of adhesive does not allow effective matching of the impedances of the support disk and the coupling element, the invention now provides between the support disk and the base surface a space, into which an adaptation layer is introduced, whose acoustic impedance is between the acoustic impedances of the support disk and the base surface.

It is advantageous if the adaptation layer is a $\lambda/4$ adaptation layer. This term is familiar to the person skilled in the art. This is a layer thickness, corresponding to a quarter of the wavelength of the ultrasound signal in the material of the adaptation layer, wherein the layer thickness can also vary from this value by ±25%, depending on the acoustic bandwidth requirement. In contrast to a typical adhesive layer, whose layer thickness is less than $3/8$ lambda.

It is advantageous if the coupling element has a second recess, which is connected with the first recess via an overflow channel. This second recess takes up excess casting compound during the production, for example during pressing of the support disk onto the viscous casting compound or during injection of casting compound into said space between the base surface and the support disk, wherein this excess casting compound is transferred laterally through the overflow channel into the second recess.

It is advantageous that the one stop is formed at least as a single bar, peripherally protruding into the first recess. This bar is preferably circumferential and is used to position the support disk in a plane parallel to the base surface of the first recess. Such a bar can be realized, for example by milling, thereby reducing the manufacturing time.

It is especially advantageous that the plurality of stops is formed as a plurality of bars, which peripherally protrude into the first recess and whose stop surfaces are in the plane. With respect to a circumferential bar, a larger space is provided for the adaptation layer in this preferred embodiment, whereby peripheral reflections of the ultrasound signal at the edge of the first recess can be prevented to a greater extent.

The stop may be advantageously formed as one or more spacers, which protrude from the base surface of the first recess. The spacers advantageously prevent central deformation of the support disk.

Thus, maximum flatness of the support disk is achieved. It is advantageous if the stop(s) is/are an integral part of the coupling element. Thus, the parallelism of the cast layer is as high as possible. This can be milled, for instance. Impedance influences by other materials are also advantageously avoided.

The bar(s) can advantageously have an undercut. This further increases the space available for the adaptation layer. In addition, the shrinkage behavior of the casting compound of the adaptation layer improves on being cured. Stresses, caused by temperature changes, are also further reduced this way.

The ultrasonic transducer advantageously has the following impedance ratios along the direction of propagation of the ultrasound signal:

$$Z_{Piezoelectric\ element} > Z_{Support\ disk} > Z_{Adaptation\ layer} > Z_{Coupling\ element}$$

wherein Z stands for the impedance (in Rayl) of the piezoelectric element (2, 22), the support disk (4, 24), the adaptation layer (36) and the coupling element (3, 23). Due to these impedance gradients, reflections of parts of the ultrasound signal are advantageously prevented.

In addition, the ultrasonic transducer is more insensitive to temperature influences as a gradient with respect to the coefficients of expansion of the individual materials is present in the direction of propagation of the ultrasound signal. In the process, the following coefficients of thermal expansion (ppm/K) occur:

$$\text{Coefficient of expansion}_{Piezoelectric\ element} < \text{Coefficient of expansion}_{Support\ disk} < \text{Coefficient of expansion}_{Adaptation\ layer} < \text{Coefficient of expansion}_{Coupling\ element}$$

The adaptation layer consists of, in particular, a polymerized synthetic material, which is polymerized under the influence of heat and shows a higher shrinkage during the polymerization than the temperature-related shrinkage of the coupling element and shows less shrinkage after polymerization than the temperature-related shrinkage of the coupling element.

The adaptation layer preferably consists of a permanently elastic material having a Shore hardness of 30-60°±5° at 25° C. according to DIN 53505. The rebound resilience is preferably between 20-40% (±5%) at 25° C. according to DIN 53512.

According to the invention, an ultrasonic transducer is used in an ultrasonic flow meter, which operates according to the runtime difference method. An appropriate ultrasonic flow meter for determining the flow velocity or the volumetric flow rate of a measurement medium with a measuring tube, comprises, to this end, at least two ultrasonic transducers, arranged along the measuring tube according to claim 2, wherein each one of the ultrasonic transducers comprises a contact surface, at which a generated ultrasound signal can be transmitted or received in the measuring tube or in the measurement medium.

BRIEF DESCRIPTION OF THE DRAWINGS

The subject matter of the invention is explained in detail in the attachments with reference to several embodiments. Illustrated are:

FIG. 3 is a perspective view of a coupling element according to the invention of a second ultrasonic transducer according to the invention;

FIG. 3*a* is a partial section of FIG. 3;

FIG. 4 is a front sectional view of the ultrasonic transducer according to the invention;

FIG. 4*a* is a partial section of the sectional view of FIG. 4;

DETAILED DISCUSSION IN CONJUNCTION WITH THE DRAWINGS

Figure 1:
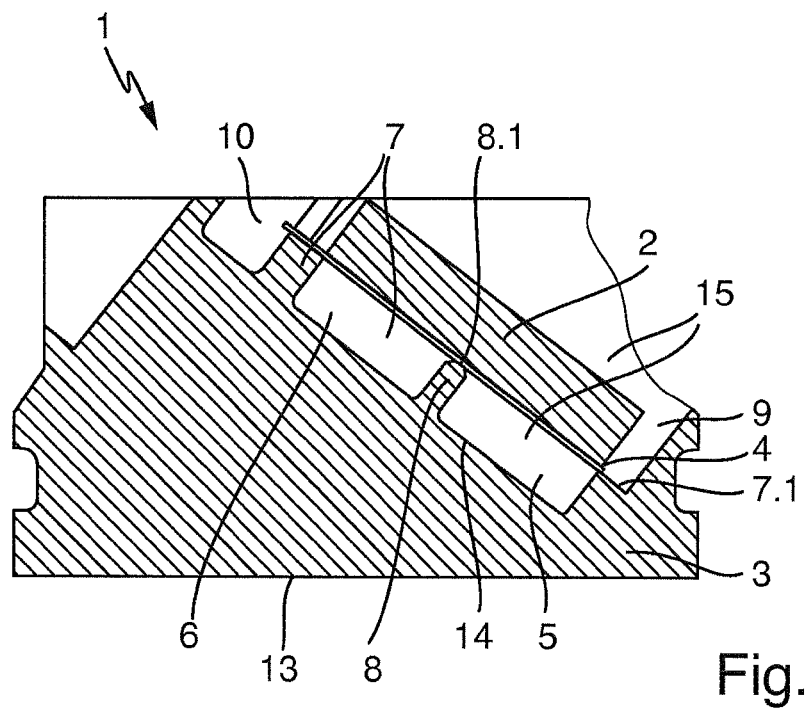
FIG. 1 is a section view of a first ultrasonic transducer according to the invention.

FIG. 1 shows an ultrasonic transducer 1 according to the invention with a coupling element 3 according to the invention.

The ultrasonic transducer 1 has an arrangement made of a piezoelectric element 2 and a support disk 4, which preferably is a metal disk here. The ultrasonic transducer also has a coupling element 3. This coupling element 3 is also often called coupling body. Coupling elements are mostly wedge-shaped, which is why the person skilled in the art speaks of a coupling wedge.

In the present embodiment, the coupling element is also designed as a coupling wedge. Subsequently, the shape and functionality of the coupling element are explained in more detail.

The basic form of the coupling element is cylindrical with an outer surface and two base surfaces. One of the two base surfaces is angled.

In contrast to previously known coupling elements, the coupling element according to the invention has a special recess 5 in the form of an oblique borehole in which the piezoelectric element 2 can be fixed.

The recess 5 arranged in the coupling element 3 is a cylindrical recess with a circular base surface 14 in the present embodiment. However, other geometric shapes, for example square-shaped depressions and the like, are also possible, depending on the shape of the piezoelectric element. Accordingly, the base surfaces of these depressions are designed with, for example, a square or rectangular shape. On the base surface 14, the predominant portion, i.e. more than 50% of the ultrasound signal generated by the piezoelectric element, is introduced into the coupling element. At the same time, the angle of incidence on the measurement medium is defined by the angle of the base surface 14.

Here, the recess certainly has at least one base surface 14 and preferably a peripheral side 15, which is at least partially limited by the coupling element.

One or a plurality of lateral bars 7 protrude from the peripheral side 15 into the recess. These are intended for a peripheral stop and plane-parallel spacing of the support disk 4 and the base surface 14 of the recess.

For example, a circumferential bar 7 with a stop surface 7.1 may protrude into the recess and be spaced from the peripheral region of the support disk 4. Such a variant is shown in FIG. 1. Alternatively, several individual bars 27 may laterally extend into the recess, thereby allowing peripheral contact of the support disk 24 with the coupling element 23 only at a point or at least only partly along the circumference. Such a variant is shown in FIGS. 3-7.

The recess also has additional means in the form of spacers 8 for spacing the support disk 4. These spacers 8 and their terminal pin-shaped stop surface 8.1 protrude from the base surface 14 into the recess 5.

The coupling element has a contact surface 13, from which the ultrasound signal exits the coupling element. In an in-line ultrasonic flow meter, the ultrasound signal can be transmitted directly to a measurement medium on this contact surface.

Figure 2:
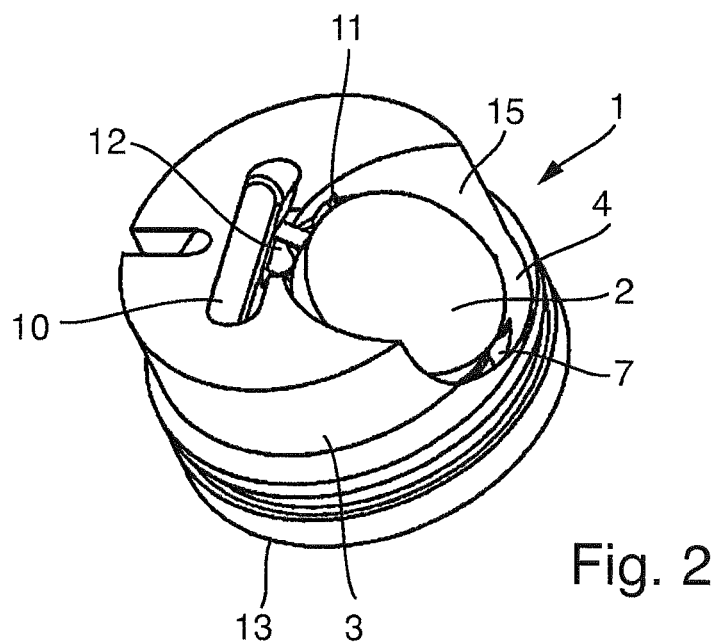
FIG. 2 is a perspective view of the first ultrasonic transducer.
Figure 5:
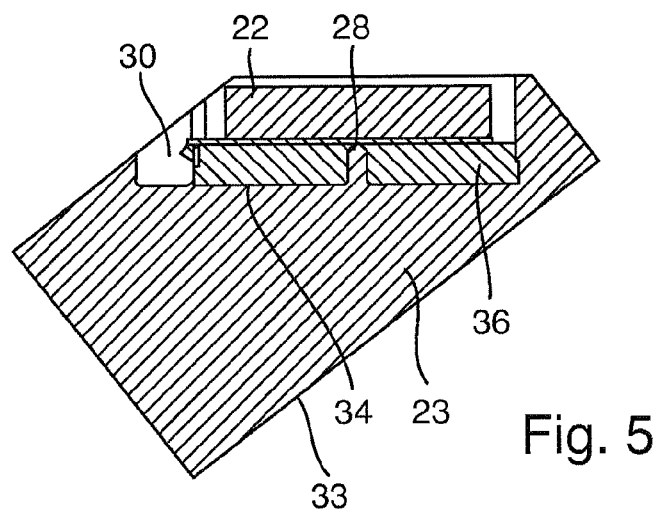
FIG. 5 is a side sectional view of the ultrasonic transducer according to the invention.

As is apparent from FIGS. 1 and 2, the recess 5 is substantially larger than the dimensions of the piezoelectric element 2. Therefore, a gap 9 is formed between the peripheral side 15 of the coupling element 3 and the piezoelectric element. In order to avoid slipping of the piezoelectric element 2 in the gap, the support disk 4 has spacers 11, which prevent lateral displacement of the piezoelectric element 2 in the recess 5.

The coupling element also includes a second recess 11, which is connected with the first recess via an overflow channel 12. For better explanation of the functional principle of the second recess 11, the way in which the ultrasonic transducer 1 is assembled will first be explained in more detail.

First, a previously described coupling element 3 according to the invention is provided. This comprises a first recess 5 for holding the support disk 4 and the piezoelectric element 2. One or more bars 7 protrude laterally into the recess 5.

Alternatively or in addition to the bar(s) 7, the coupling element 3 also comprises the above-described spacers 8, which allow positioning of the support disk 4 in a plane parallel to the base surface 14 of the recess 5.

A casting compound is introduced into the first recess 5 of this coupling element 3. The casting compound was omitted from the sectional view of FIG. 1 for clarity. The casting compound is used to connect the support disk to the coupling element. An adhesive was used for the connection of the support disk 4 to date. The problem was that, because of its inhomogeneous distribution, the adhesive layer interferes with the ultrasound signal to a certain extent and that a very big transition region of the acoustic impedances between support disk and coupling element was present. A uniformly thick adaptation layer of a casting compound within the first recess does not have this disturbing influence.

This layer of casting compound should be present within a space, which is defined by the support disk mounted on the bar(s) and/or the spacer(s) and the first recess 5.

Casting compound is poured into the recess until the casting compound volume is slightly higher than the actual filling volume of the space to be filled, so as to keep the transition region between the casting compound and the support disk free of air as far as possible.

Subsequently, the support disk is pressed into the recess until it rests on the spacer(s) and/or the bar(s). In this case, the excess volume of the casting compound is directed into the lateral overflow channel 11 and from there, to the second recess 12. Thus, this second recess 12 is used only as a collecting container for casting compound, which has been pushed to the side when pressing the support disk 4.

Following this positioning of the support disk 4 in the first recess 5 of the coupling element 3, the piezoelectric element 2 is mounted on the support disk. Here, spacers 11 that secure the piezoelectric element against lateral slipping protrude from the support disk 4 in the direction of the piezoelectric element.

The method described above is only one preferred way of construction of the ultrasonic transducer 1 according to the invention. Here, the ultrasonic transducer can be produced in a single work step, without the need of re-tensioning or releasing the coupling element from a fixing bracket.

Alternatively, it is also possible to arrange, for example, an insertion channel on the periphery—preferably opposite the overflow channel 12—and to inject casting compound into the space 6 between the support disk 4 and the base surface 14 of the first recess 5 at least until the casting compound escapes through the overflow channel 12.

FIGS. 3-7 show another embodiment of a coupling element 23 according to the invention, and an ultrasonic transducer 21 having a support disk 24 and a piezoelectric element 22.

As shown in FIG. 3, this coupling element 23 also comprises a first recess 25 with a base surface 34 which is introduced, for example milled, into the coupling element. Even in this case, the base surface 34 is the surface at which the ultrasound signal of the piezoelectric element 22 enters the coupling element 23.

Unlike FIGS. 1 & 2, the coupling element comprises a plurality of bars 27 in this case, each of which has very small stop surfaces 27.1 in the form of balconies for the support and/or stop of the support disk 24. The bars 27 also comprise bridging arms 27.2, which protrude from the peripheral side 35 of the first recess 25. A pin-shaped spacer 28 with a terminal pin-shaped stop surface 28.1 protrudes centrally from the base surface 34. The central position of a spacer is preferred, but is not mandatory. The terminal stop surface of the spacer 28 and the stop surfaces 27.1 of the bars 27 are all arranged in a plane which is parallel to the base surface 34 of the recess 25.

As shown in the previous example in FIG. 2, a second recess 30 and an overflow channel 32, which shall receive an excess volume of a casting compound introduced into the first recess 25 during production, is also provided in the coupling element 23 of FIGS. 3-7.

FIGS. 4-7 shows the ultrasonic transducer in the assembled state. In these figures, the space of the first recess between the support disk 24 and the base surface 34 is filled with casting compound 36.

The coupling element 23 also has a wedge-shaped design. It has a coupling surface 33, at which the ultrasound signal ideally leaves the coupling element 23.

In this embodiment as well, the piezoelectric element 22 is not located at the edge of the coupling element 23 but separated from it by a gap 29.

The peripheral bars 27 comprise a so-called undercut 37 in the direction of the base surface 34. This undercut is also filled with casting compound. As casting compounds do not usually possess any pronounced adhesion-enhancing properties, the undercut 37 allows for better anchoring of the casting compound 36 in the recess 25.

Alternatively, the area of the base surface and the peripheral side of the first recess can be increased. This takes place, for example, in machining operations such as embossing, spraying, sandblasting, etching, turning, milling or drilling in order to enhance adherence of the casting compound applied thereon.

For casting compounds, which are more intensely subject to a shrinkage process, the undercut also allows for uniform shrinkage of the casting compound from the top down and not to the center.

The support disk 24 has a lower surface 24.1 directed towards the coupling element 23 and an upper surface 24.2 facing the piezoelectric element. The lower surface is preferably in bubble-free contact with the casting compound and rests laterally on the stop surfaces 27.2 of the bars 27.

Figure 6:
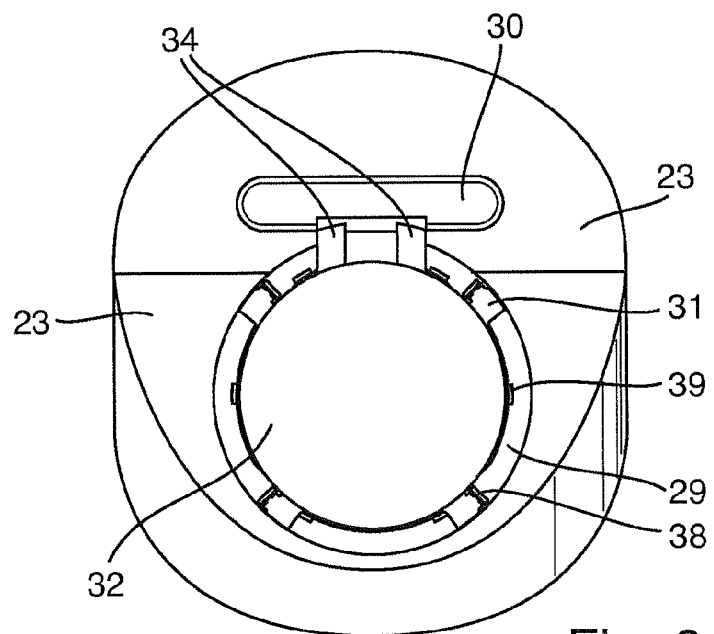
FIG. 6 is a front view of the ultrasonic transducer.
Figure 7:
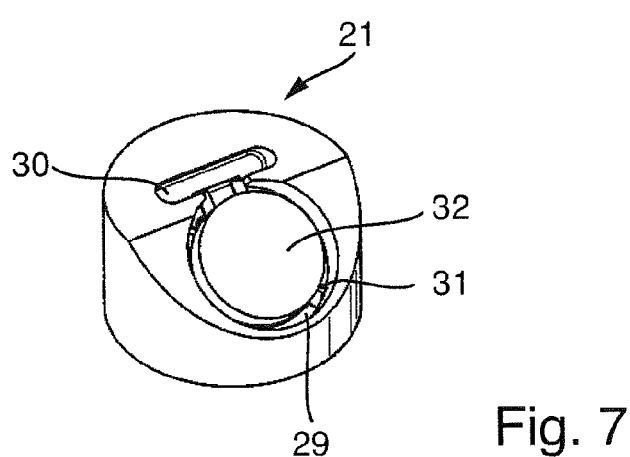
FIG. 7 is a perspective view of the second ultrasonic transducer according to the invention.

Based on FIG. 6, the support and mounting of the piezoelectric element 22 on the support disk 24 is illustrated again. The spacers 31 are used for formation of the recess and for securing the piezoelectric element 22 inside the recess 25 against lateral slipping. Here, the spacers 31 comprise angled sheet metal segments 35, which have the same width as the gap 29 between the piezoelectric element 22 and the coupling body 23, and lean against the peripheral side 35 of the coupling element 23 and against the piezoelectric element 22. The support disk 24 also comprises additional holding elements 39.

Each of the three sheet metal segments 35 of the support disk 24 are formed, offset by approximately 120° with respect to each other and self-centered with respect to the recess 25. Furthermore, the support disk 24 has three of the aforementioned holding elements 39, which are offset by about 120° from each other and also center the piezoelectric element 22. The holding elements 39 and the sheet metal segments 35 are bent out of the plane of the support disk 24.

The coupling element 3, 23 can consist of a high-temperature thermoplastic material such as an unfilled polyetherimide (PEI), that is commercially available under the tradename Ultem 1000.

As seen in FIG. 1, the coupling element 3 can have an annular groove for a recess of an O-ring at its outer periphery to tightly fix the ultrasonic transducer 1 in a borehole of a container or of a measuring tube of a flow meter.

The ultrasonic transducer 1, 21, as mentioned before can be inserted, for example, into a measuring tube of an ultrasonic flow meter, in which a measurement medium (powder, liquid, gas, steam) flows, whose volumetric flow rate and/or flow rate is/are to be measured. Here, two ultrasonic transducers are inserted, mounted or strapped into the measuring tube, spaced from each other, and alternately switched as ultrasonic transmitter and ultrasonic receiver.

For example, the runtime difference of the transmitted signals allows for calculation of the flow rate and/or the volumetric flow rate electronically using a known method.

The piezoelectric element 2, 22 may be disk-shaped and preferably consists of a ceramic piezoelectric material, for example, a standard PZT-5 soft ceramic.

The thickness of the support disk 4 is preferably at most equal to a quarter of the wavelength that the ultrasound signal that is emitted from the piezoelectric element has in the support disk 4. The support disk preferably consists of pure aluminum. But it can also consist of, for example, titanium, stainless steel, brass or lead or alloys.

In particular, liquid-curing epoxy resins are especially suitable as casting compound. Specifically, an epoxy resin that is highly filled with aluminum oxide, with more than 50 wt % aluminum oxide proportions, in particular 70-80 wt %, can be used. Likewise, melts that solidify and are introduced at a temperature of the sensor that is higher than the operating temperature are possible. Or consists of permanently elastic casting compound mixed with particles that are smaller in terms of wavelength. This also reduces the thermal stresses.

The sequence of the individual layers and components results in an impedance gradient for the ultrasound signal up to the exit from the ultrasonic transducer.

The impedances of the respective layers and components of the ultrasonic transducer are specified according to the metric system and are as follows:

Piezoelectric element: Z=18-30 MRayl;
Support disk (aluminum disk): Z=less than 18 MRayl, especially 10-17 MRayl; as an alternative to the aluminum disk, e.g. glass, ceramic or glass-ceramic Z=10 to 18 MRayl or magnesium disk,
Adaptation layer or casting compound (epoxy resin filled with $Al_2O_3$): 5-9 MRayl, especially 6.5-7.5 MRayl;
Coupling element made of PEI: less than 4 MRayl, especially 2.5-3.5 MRayl.

Better signal strength of the ultrasound signal can advantageously be achieved due to the more adjusted impedance transitions.

The layer sequence also results in a gradient with respect to the thermal coefficient of expansion in the sequence of components, resulting in longer life of the ultrasonic transducer also in case of improved thermal cycling resistance and thus, it can be used for measurements in larger temperature ranges, without exposing the material layers to high tensile and shear stresses.

The shrinkage of the coupling element is 45-80 ppm/K, preferably 50-70 ppm/K. The shrinkage of the adaptation layer of the casting compound is 20-40 ppm/K, preferably 25-35 ppm/K. The shrinkage of the support disk is 10-20 ppm/K. The shrinkage of the piezoelectric element is less than 10 ppm, preferably 4-6 ppm/K.

In the present invention, both one or more bars 7, 27, protruding laterally into the recess 5, 25, as well as spacers 8, 28, protruding from the base surface 14, 34, refer to stops, whose stop surfaces are in a plane parallel to the base surface 14, 34 of the first recess.

This allows for alignment of the support disk, or in a significantly less preferred case, the piezoelectric element, directly parallel to the base surface 14, 34 of the first recess.

The invention claimed is:

1. An ultrasonic transducer, comprising:
   a coupling element;
   a piezo-electric element, and
   a support disk,
   said coupling element comprises a first recess with said piezoelectric element arranged in said first recess, said first recess comprises a terminal base surface, on which an ultrasound signal that is generated by said piezoelectric element can be introduced into said coupling element, wherein:
   in said first recess, said support disk is arranged, on whose upper side that is directed away from said coupling element, said piezoelectric element is arranged;
   said support disk and said base surface delimit a space in which an adaptation layer is arranged; and
   said support disk is provided for reducing thermal stresses on said piezoelectric element,
   wherein within said first recess, the coupling element comprises one or a plurality of stops, each having at least one stop surface, which extends along a plane; and said plane runs parallel to said base surface of said first recess and a space is defined between said plane and said base surface for accommodating material for an acoustic adaptation layer,
   wherein said plurality of stops is formed as a single stop as at least one bar, which peripherally protrudes into said first recess, or wherein said plurality of stops are formed as a plurality of bars, which peripherally protrude into said first recess and whose stop surfaces are in the plane.

2. The ultrasonic transducer according to claim 1, wherein:
   said adaptation layer is a λ/4 adaptation layer (±25% of this value).

3. The ultrasonic transducer according to claim 1, wherein:
   said coupling element comprises a second recess which is connected with said first recess via an overflow channel.

4. The ultrasonic transducer according to claim 1, wherein:
   said plurality of stops has a stop formed as one or more spacer(s), which protrude from said base surface of said first recess.

5. The ultrasonic transducer according to claim 1, wherein:
   said stop(s) is/are an integral part of said coupling element.

6. The ultrasonic transducer according to claim 1, wherein:
   said bar(s) have an undercut.

7. The ultrasonic transducer according to claim 1, wherein:
   the ultrasonic transducer has the following impedance ratios in the direction of propagation of the ultrasound signal:

$$Z_{Piezoelectric\ element} > Z_{Support\ disk} > Z_{Adaptation\ layer} > Z_{Coupling\ element}$$

wherein Z stands for the impedance (in Rayl) of said piezoelectric element, said support disk, said adaptation layer and said coupling element.

8. The ultrasonic transducer according to claim 1, wherein:
   the ultrasonic transducer has a gradient of the thermal coefficient of expansion (ppm/K) in the direction of propagation of the ultrasound signal:

$$\text{Coefficient of expansion}_{Piezoelectric\ element} < \text{Coefficient of expansion}_{Support\ disk} < \text{Coefficient of expansion}_{Adaptation\ layer} < \text{Coefficient of expansion}_{Coupling\ element}.$$

9. The ultrasonic transducer according to claim 1, wherein:
   said adaptation layer consists of a polymerized synthetic material, which is polymerized under the influence of heat and shows a higher shrinkage during the polymerization than the temperature-related shrinkage of said coupling element and shows less shrinkage after polymerization than the temperature-related shrinkage of said coupling element.

10. The ultrasonic transducer according to claim 1, wherein:
    said adaptation layer consists of a permanently elastic material with a Shore hardness of 30-60°±5° at 25° C. according to DIN 53505.

11. The ultrasonic flow meter for determining the flow velocity or the volumetric flow rate of a measurement medium with a measuring tube and at least two ultrasonic transducers according to claim 1, arranged along the measuring tube, wherein each one of said ultrasonic transducers comprises a coupling body with a contact surface, at which a generated ultrasound signal can be transmitted or received in the measuring tube or in the measurement medium.

* * * * *